(12) United States Patent
Takeshima

(10) Patent No.: US 6,224,771 B1
(45) Date of Patent: May 1, 2001

(54) ORGANIC WASTE RECYCLING METHOD

(75) Inventor: Hiromichi Takeshima, Saitama (JP)

(73) Assignee: Food Cycle Systems Co., Ltd., Ageo (JP)

( * ) Notice: Subject to any disclaimer, the term of this patent is extended or adjusted under 35 U.S.C. 154(b) by 0 days.

(21) Appl. No.: 09/394,670

(22) Filed: Sep. 13, 1999

(30) Foreign Application Priority Data

Nov. 9, 1998 (JP) .................................. 10-317591
Feb. 3, 1999 (JP) .................................. 11-025892

(51) Int. Cl.[7] .............................. C02F 3/00; C05F 9/04; C05F 17/00; B09B 3/00
(52) U.S. Cl. ............................ 210/610; 435/262.5; 71/8; 71/21; 71/23; 71/14
(58) Field of Search ..................... 210/610, 612, 210/613; 435/262.5, 289.1, 290.1–290.4; 71/8, 14, 21, 23

(56) References Cited

U.S. PATENT DOCUMENTS

| | | |
|---|---|---|
| 2,951,755 * | 9/1960 | Joffe . |
| 3,640,696 * | 2/1972 | Goldmann . |
| 3,773,659 * | 11/1973 | Carlson et al. . |
| 3,932,166 * | 1/1976 | Vignovich et al. . |
| 4,134,749 * | 1/1979 | Houser et al. . |
| 4,414,335 * | 11/1983 | Kipp, Jr. . |
| 4,836,918 * | 6/1989 | Szikriszt . |
| 5,248,602 * | 9/1993 | Schmid et al. . |
| 5,269,634 * | 12/1993 | Chynoweth et al. . |
| 5,354,349 * | 10/1994 | Inoue . |
| 5,603,744 * | 2/1997 | Kurner . |
| 5,782,950 * | 7/1998 | Kanitz . |

FOREIGN PATENT DOCUMENTS

WO 94/12576 * 6/1994 (WO) .

* cited by examiner

Primary Examiner—David A. Simmons
Assistant Examiner—Fred Prince
(74) Attorney, Agent, or Firm—Armstrong, Westerman, Hattori, McLeland & Naughton, LLP

(57) ABSTRACT

A method of recycling organic wastes in which organic wastes such as garbage from households, restaurants are recycled and utilized as a pro-ferment for other organic wastes such as feces and urine of domestic animals, pruned branches, bush, and lawn, which are generated at parks, river terraces, roads, and the like to utilize them as compost. In the organic waste recycling method according to the present invention, a pro-ferment, which is obtained by mixing a medium with an organic waste, is mixed with another organic waste to accelerate fermentation of the latter organic waste and produce compost. In the above method, the medium may be composed of dried coffee refuse, one of wheat bran and coconut fiber, and a ferment bacillus.

5 Claims, 4 Drawing Sheets

Case A
Pro-ferment (P):Feces(F)
=1 : 1

Case B
Pro-ferment (P):Feces(F)
=1 : 2

Case A
Pruned Braches:Pruned Bush:
Pro-ferment (P)
=1 : 1 : 0. 0 2

Case B
Pruned Braches:Pruned Bush
= 1 : 1

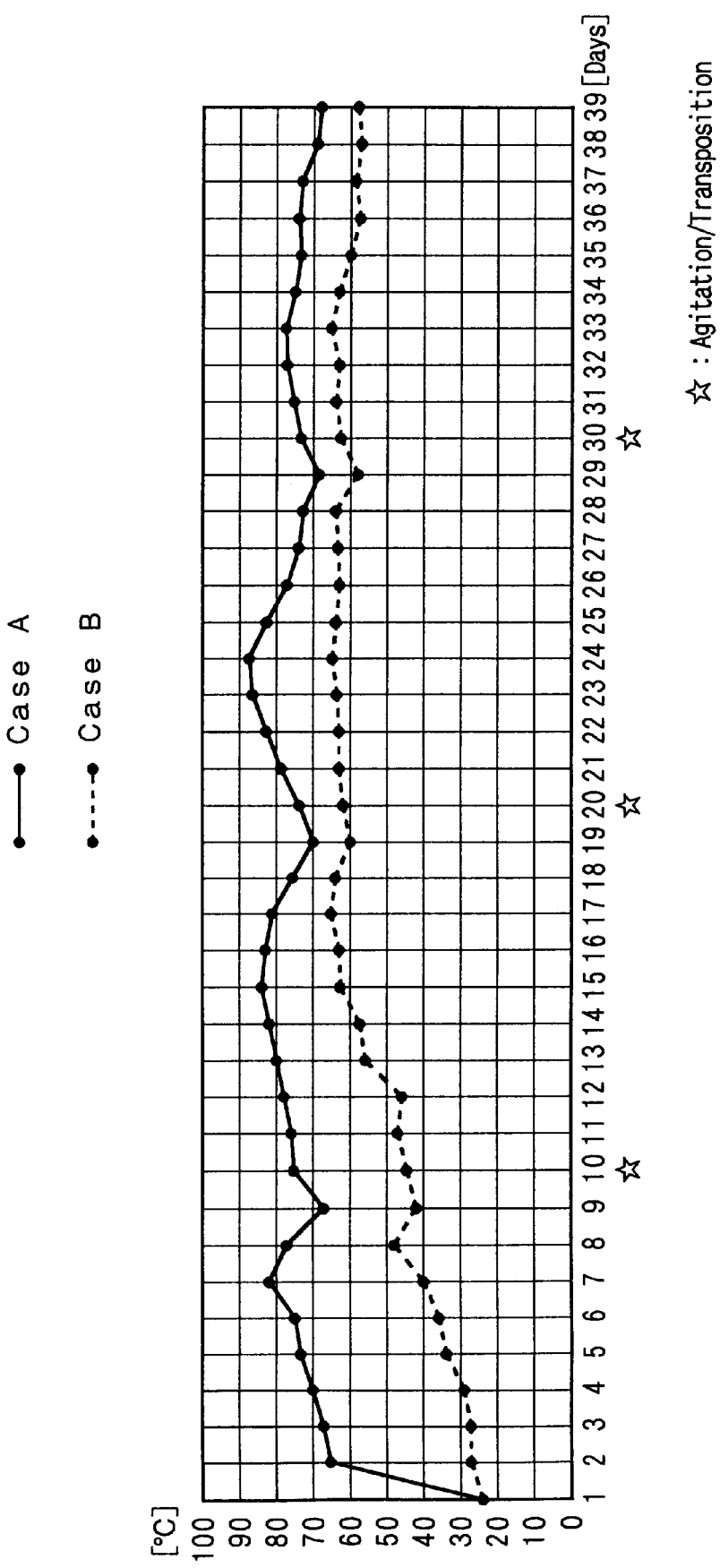

ORGANIC WASTE RECYCLING METHOD

BACKGROUND OF THE INVENTION

1. Field of the Invention

The present invention relates to a method of recycling organic waste, and more particularly to a method of recycling organic wastes in which a pro-ferment, that is produced by mixing a medium with an organic waste, are mixed with other organic wastes such as feces and urine of domestic animals, pruned branches, bush, and lawn, and which accelerates the fermentation of the latter organic waste to obtain compost.

2. Description of the Related Art

Most of the organic waste such as garbage from households, restaurants and the like is burnt or disposed of in a conventional way at reclaimed lands or the like.

However, with conventional methods, problems such as dioxin pollution from garbage furnace and the leakage of harmful materials or matter contained in organic wastes at reclaimed lands remain unsolved. In addition, the capacity of final places for disposal is limited.

In consideration of the above-mentioned problems, in recent years, organic wastes have been ground and dried to be utilized as compost, but the recycling ratio of the wastes is still low.

By the way, Japanese stockbreeding output has been decreasing due to the shortage of successors, the increase in imported meat, environmental problems such as an offensive odor emitted from stockbreeders, and so on. Therefore, it is generally said that a large-scale management for the future is indispensable to realizing favorable managing conditions.

One of the problems for the large-scale management is the disposal of the feces and urine of domestic animals. Generally, the feces and urine of dairy cows are high in a water content, and low in a nitrogen content, which makes the fermentation of the feces and urine difficult, and it takes about one year to finish the fermentation when the feces and urine are merely left as they are. Even machinery is used, it is necessary to accelerate the fermentation for approximately one and half months after decreasing water content of the feces and urine before using the machinery for two to three months in summer or for more than one month in winter. Therefore, the feces and urine of dairy cows are mostly disposed of at farms as raw, causing environmental problems such as an offensive odor and pollution of rivers throughout the country.

To solve the above-mentioned problems, Japanese government and local municipalities have subsidized stockbreeders to facilitate the construction of compost manufacturing facilities, and there have been some cases in which local municipalities have constructed compost manufacturing facilities to handle the feces and urine of domestic animals generated in their territories by themselves.

Furthermore, organic wastes such as pruned branches, bush, and lawn, which are generated mainly at parks, river terraces, roads, households, and golf courses also have been burnt in a conventional way. However, the capacity of burning facilities is also limited, or maybe the disposal of such organic wastes are very cumbersome or difficult, which is what local municipalities are anxious about.

In addition to the above countermeasures, they have tried to ferment the organic wastes and utilized them as compost. However, whether the fermentation is preferably carried out or not often depends on the climate, kinds and properties of pruned branches, bush, and lawn. Especially when the pruned branches have many trunks and stumps, the nitrogen content of the pruned branches becomes low, which makes the fermentation of the branches difficult. Therefore, no effective disposing measures have been found so far.

SUMMARY OF THE INVENTION

The objective of the present invention is to provide a method of recycling organic wastes in which organic wastes such as garbage from households, restaurants are recycled and utilized as a pro-ferment for other organic wastes such as feces and urine of domestic animals, pruned branches, bush, and lawn, that are generated at parks, river terraces, roads, and the like to utilize them as compost.

To accomplish the above objective, in a method of recycling organic wastes according to the present invention, a pro-ferment, which is obtained by mixing a medium with organic wastes, are mixed with other organic wastes to accelerate the fermentation of the latter organic waste and to produce compost.

With the above method according to the present invention, not only is it unnecessary to neither burn nor dispose of both the former and latter organic wastes, but also compost for agricultural products can be obtained from the organic wastes.

In the above method according to the present invention, the medium may be composed of dried coffee refuse, one of wheat bran and coconut fiber, which are easily obtainable, and ferment bacillus.

Furthermore, in the above method, the latter organic wastes can be the feces and urine of domestic animals such as dairy cows. In case of the feces and urine of dairy cows, 0.4 to 0.6 ton of the pro-ferment is preferably mixed with one ton of the feces and urine to obtain optimum water content of the feces and urine for the fermentation thereof. And, in case of the feces of dairy cows, 0.3 to 0.5 ton of the pro-ferment is preferably mixed with one ton of the feces to obtain optimum water content thereof.

With this method, it is unnecessary to burn and dispose of organic wastes, and nor is there also need to feed the feces and urine of domestic animals as they are. Furthermore, compost is obtained from the feces and urine, which can be utilized for agricultural productions.

Furthermore, in the above method, the latter organic waste can be one of the pruned branches, bush, lawn, and mixture of these materials, which allows the former and the latter organic waste such as pruned branches not to be burnt and disposed of. In addition, compost is obtained from the pruned branches and so on.

BRIEF DESCRIPTION OF THE DRAWINGS

The present invention will be more apparent from the ensuring description with reference to the accompanying drawings wherein:

FIG. 6 is a graph showing the transition of the fermentation temperature of the pruned branches and bush in the test of the organic waste recycling method according to the present invention.

DETAILED DESCRIPTION OF PREFERRED EMBODIMENTS

Now, the first embodiment of the present invention will be explained with reference to drawings.

Figure 1:
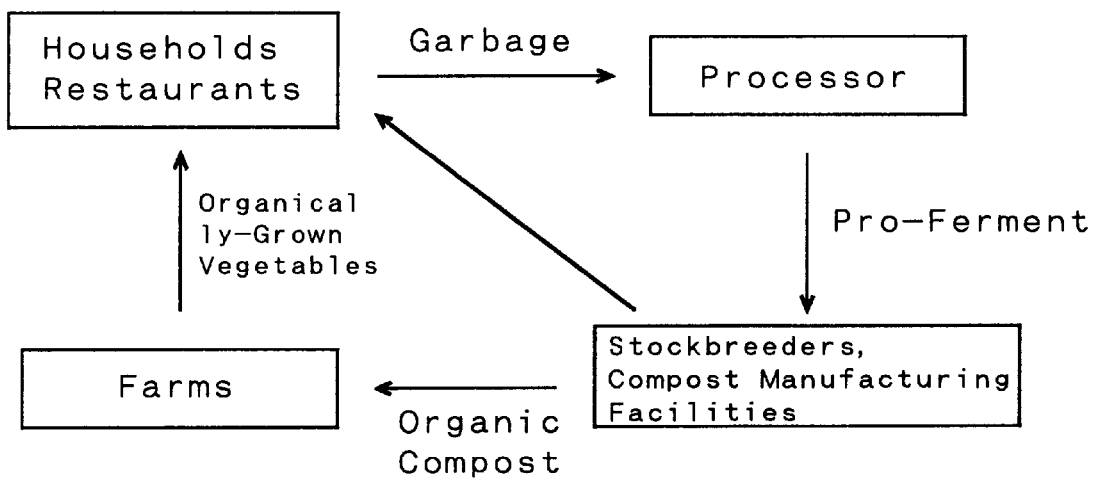
FIG. 1 is a flowchart showing an organic waste recycling method according to the first embodiment of the present invention.

FIG. 1 is a flowchart showing an organic waste recycling method according to the first embodiment of the present invention. As illustrated in this figure, firs of all, organic wastes such as garbage from households, restaurants and the like are fed to a processor to produce a pro-ferment. Since the kinds and dimensions of the processor used are selectable, generally used processors with agitating blades may be used.

It is important, for the processor, to effectively grind garbage through agitating blades in a gyle; homogeneously mix the medium and the garbage with each other; and discharge water, which is contained in the garbage and generated through the decomposition of a ferment, from upside of the processor. Furthermore, it is important, for a panel heater at the bottom of the gyle, a hot air heater at the upper portion of the gyle, and the like, to maintain the temperature in the gyle from 50° C. to 75° C. to evaporate water therein and stabilize the function of microorganism. It is also important to discharge water, which is vaporized through a discharge fun, out of the gyle. Dried coffee refuse, wheat bran, coconut fiber, or the like, and a ferment bacillus are mixed to obtain the medium.

It is preferable to maintain the water content of material, which is discharged from the processor (hereinafter referred to as "pro-ferment"), below 30% by using the processor and the medium. A ferment bacillus functions to prevent the propagation of germs.

The pro-ferment described above is mixed with feces and urine at stockbreeders, compost manufacturing facilities, or the like to accelerate the fermentation. This pro-ferment accelerates the fermentation not only through the adjustment of the water content of the feces and urine but also through the functions of the ferment bacillus contained in the pro-ferment. Therefore, the above method is definitely different from conventional methods in which sawdust powder or the like is used to merely adjust the feces and urine of domestic animals.

In addition to the above, in recent years, it is not easy to obtain sawdust powder in adjusting the water content of the feces and urine of domestic animals. The powder is so expensive, that it is rather economically preferable to adjust the water content and accelerate the fermentation of the feces and urine through a medium which is produced by mixing a ferment bacillus to dried coffee refuse, wheat bran, or coconut fiber.

Organic compost produced by the above method is utilized at farms. Thus, organically-grown vegetables cultivated at the farms are restored to households, restaurants, and the like to complete a cycle.

Figure 2:
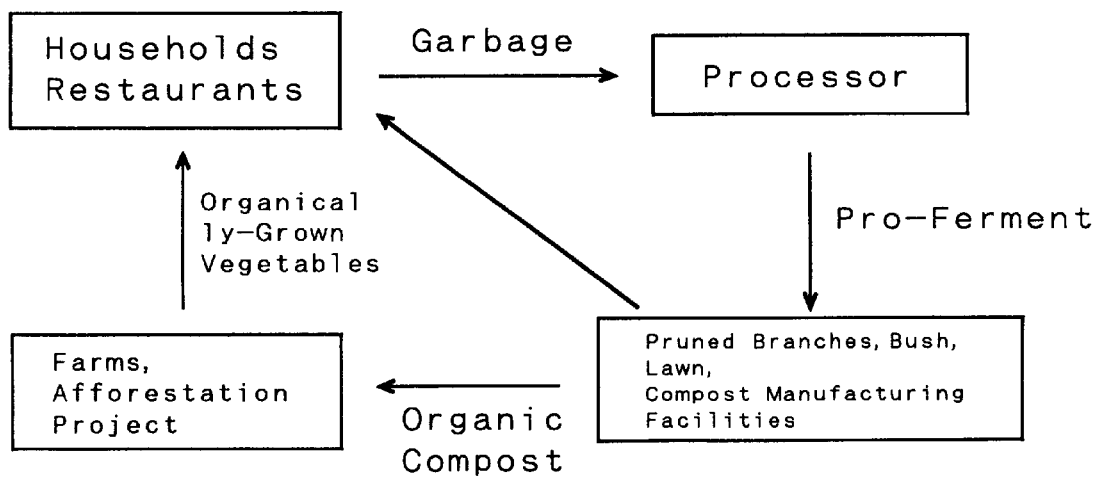
FIG. 2 is a flowchart showing an organic waste recycling method according to the second embodiment of the present invention.

FIG. 2 is a flowchart showing an organic waste recycling method according to the second embodiment of the present invention. In this embodiment, pruned branches, bush, and lawn are composted.

As illustrated in the figure, first of all, like the first embodiment, organic wastes such as garbage from households, restaurants and the like, and the medium are fed to a processor to produce a pro-ferment.

Then, the pro-ferment is mixed with pruned branches, bush, and lawn, which are generated at parks, river terraces, roads, households, and golf courses at those places, compost manufacturing facilities, or the like to accelerate the fermentation of those materials. Since pruned branches, bush, and lawn contain less waster than do the feces and urine of domestic animals, it is unnecessary to adjust the water content thereof by using sawdust or the like. Thus, the pro-ferment is used to accelerate the fermentation of the pruned branches and so on through the function of the ferment bacillus contained in the pro-ferment.

Finally, organic compost produced is utilized at farms or for afforestation projects. Therefore, organically-grown vegetables cultivated at the farms are restored to households, restaurants, and the like.

Now, as an example of the use of the pro-ferment, at first, the pro-ferment is applied to the feces and urine of dairy cows.

The amount of feces and urine excreted from a dairy cow is approximately 30 kg and 20 kg per day respectively, therefore, totally 50 kg of feces and urine is excreted. The water content of the feces and urine is approximately 88%, and that of feces only is about 81%.

When the water content of the pro-ferment is about 20%, since an optimum water content for fermenting the feces and urine is 65±5%, as shown in Table 1, 0.4 to 0.6 ton of pro-ferments are mixed with 1 ton of feces and urine of dairy cows to realize an optimum water content.

TABLE 1

| Feces and Urine (ton) | Pro-ferment (ton) | Water Content (%) |
| --- | --- | --- |
| 1 | 0.6 | 63 |
|   | 0.5 | 65 |
|   | 0.4 | 69 |

Note: Water contents of feces and urine, and pro-ferment are 88% and 20%, respectively.

On the other hand, when the pro-ferment is used for feces only, as shown in Table 2, 0.3 to 0.5 ton of pro-ferments are mixed with 1 ton of feces of dairy cows to realize an optimum water content.

TABLE 2

| Feces (ton) | Pro-ferment (ton) | Water Content (%) |
| --- | --- | --- |
| 1 | 0.5 | 61 |
|   | 0.4 | 63 |
|   | 0.3 | 67 |

Note: Water contents of feces and pro-ferment are 81% and 20%, repectively.

The fermentation of the feces and urine of dairy cows with the above method is completed within one and half months. Thus, the resultant compost can be utilized at farms or the like.

Furthermore, agricultural products produced by using the feces and urine of dairy cows as compost at farms or the like are utilized at households, restaurants, or the like, which are the origins of organic waste, enabling the organic wastes to completely be recycled.

Now, a test in which the pro-ferment was applied to the feces and urine of dairy cows will be explained.

Dried coffee refuse, wheat bran, and ferment bacillus were mixed with garbage from a family style restaurant to obtain a pro-ferment, and the pro-ferment and the feces and urine were mixed with each other while changing the mixing ratio thereof at a stock farm, after that, the fermentation temperature of the mixture was measured.

Figure 3:
FIG. 3 is a drawing for explaining the procedure of mixing a pro-ferment and feces and urine in a test of the organic waste recycling method according to the present invention.
Figure 3:

In this test, 1.5 tons of pro-ferment were divided into two lots, the feces and urine of dairy cows whose weight was the same as one lot of the pro-ferment, were divided into three lots. Then, as illustrated in FIG. 3, the fermentation temperature of the feces and urine was measured in two cases (Case A: one lot of pro-ferment and one lot of feces and urine of dairy cows, Case B: one lot of pro-ferment and two lots of feces and urine of dairy cows).

In order to mix the pro-ferment and the feces and urine and to allow aerobic ferment bacillus to efficiently touch fresh air, both the pro-ferment and the feces and urine were agitated and transposed once per four days to once per two weeks. The test was finished at the moment during which a smell caused by the fermentation became weak.

Figure 4:
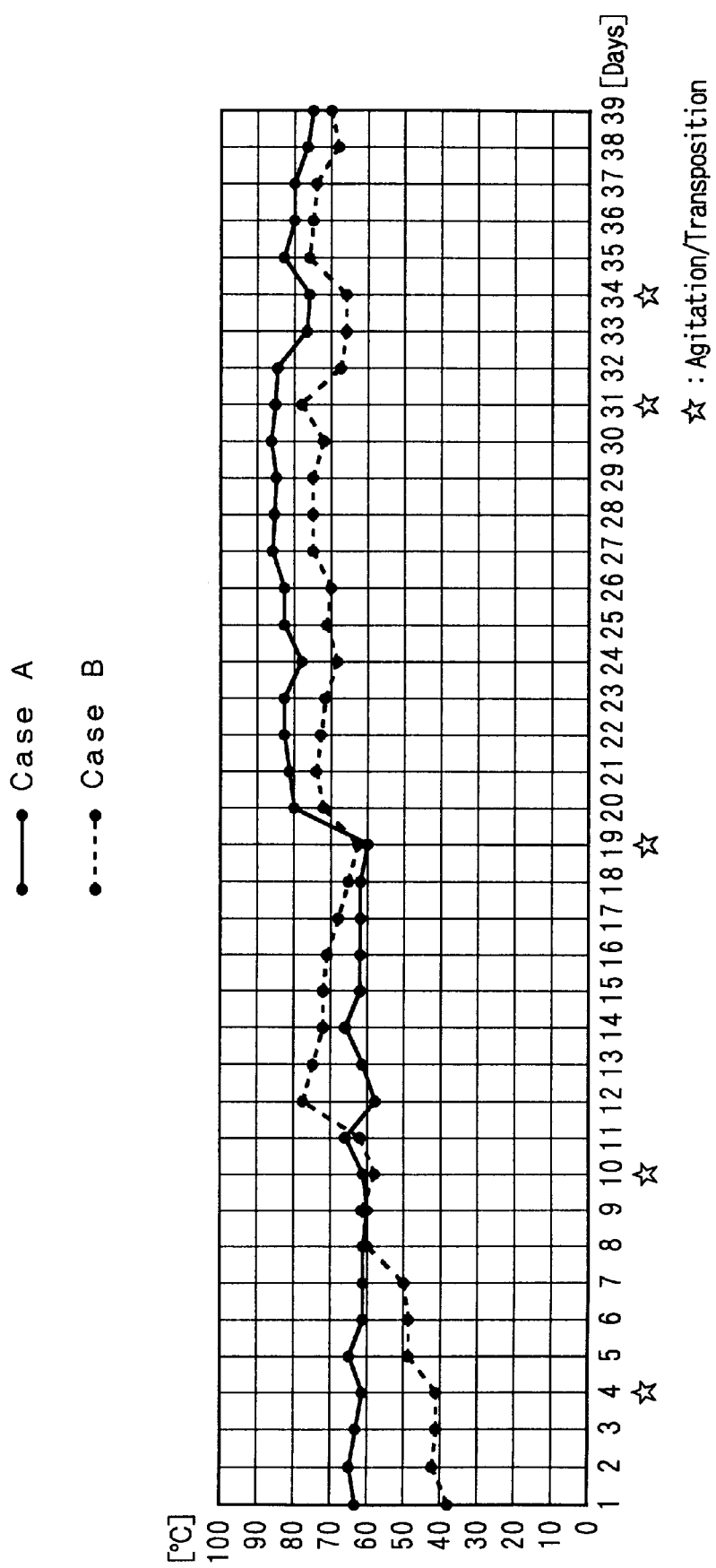
FIG. 4 is a graph showing the transition of the fermentation temperature of feces and urine in the test of the organic waste recycling method according to the present invention.

Next, the result of the above test will be explained with reference to FIG. 4 showing the transition of the fermentation temperature of the feces and urine.

(1) In Case A, the fermentation temperature on the $1^{st}$ day was 63° C., and in Case B, the temperature was 38° C., that is, the beginning of the fermentation was good in Case A. The temperature in Case B reached the 60° C. level at the $8^{th}$ day.

(2) In Case A, the fermentation temperature was maintained approximately at the former half of 60° C. from the $1^{st}$ to the $19^{th}$ day. On the other hand, in Case B, the temperature reached 70° C. at $12^{th}$ day. Although the beginning of the fermentation was not good in Case B in comparison to Case A, the temperature reached 70° C. earlier in Case B than in Case A.

(3) In case A, the fermentation temperature suddenly increased to the 80° C. level on the $20^{th}$ day, and after that, a high fermentation temperature was maintained until the end of the test. In Case B, the temperature reached the 70° C. level on the $12^{th}$ day, and after that, the level was steadily maintained.

(4) In case A, the fermentation at a high temperature of the 80° C. level after the $20^{th}$ day caused the feces and urine to be burnt. On the other hand, in Case B, the temperature did not reach 80° C. An optimum fermentation temperature is 60° C. to 80° C. It is generally said that when the temperature exceeds 80° C., it is better to decrease the temperature through watering or the like.

(5) In both Cases A and B, the smell generated by the fermentation became weak after about one month from the beginning of the test.

(6) As described above, this test proves that the pro-ferment is effective to the acceleration of the fermentation of the feces and urine of dairy cows. Although no special problem remains in the mixing ratio of the feces and urine and the pro-ferment in both Cases A and B, an appropriate management for the increase in the fermentation temperature is necessary in Case A.

In the above embodiment, a pro-ferment is applied to the feces and urine of dairy cows, but the pro-ferment may be applied in the same manner to other organic waste with high water contents such as feces and urine of beef cattle and those of pigs.

Now, a test in which the pro-ferment is applied to pruned branches and bush will be explained.

For example, the water content of pruned branches and pruned bush are supposed to be 35% and 75% respectively, and when those are mixed with the ratio of branches and bush from 3 to 7, the water content of the resultant becomes 63%. As a result, the water content of the resultant is within 65±5%, and the adjustment of the water content is not required unlike the feces and urine of dairy cows.

The above resultant is fermented while being left as it is without adding sawdust or the like in a conventional way. In this case, the temperature of the resultant becomes rather too high through the fermentation so that water is added to the resultant when the resultant is agitated and transposed once a week. Furthermore, if pruned branches have many trunks and stumps, the nitrogen content of the pruned branches is low, and the fermentation of the branches will be difficult.

In the present invention, such pruned branches and bush as described above are also intended to accelerate their fermentation by adding a pro-ferment and to be utilized as compost in farms or the like.

Now, a test in which the pro-ferment is applied to pruned branches and bush will be explained.

Figure 5:
FIG. 5 is a drawing for explaining the procedure of mixing a pro-ferment, pruned branches and bush in the test of the organic waste recycling method according to the present invention.
Figure 5:

In this test, two lots of 1000-liter finely ground pruned branches and 1000-liter pruned bush were prepared. As illustrated in FIG. 5, 20 liters of pro-ferment were mixed to a lot of the pruned branches and bush (Case A). Another lot was as it was without pro-ferment (Case B), and thereby the fermentation temperature of the material in each lot was measured. The pro-ferment used was manufactured by adding dried coffee refuse, coconut fiber, and ferment bacillus to garbage from a family style restaurant and mixing them.

In order to mix the pro-ferment and the pruned branches and bush, and to allow an aerobic ferment bacillus to efficiently touch fresh air, both the pro-ferment and the pruned branches were agitated and transposed once per ten days.

Next, the result of the above test will be explained with reference to FIG. 6 showing the transition of the fermentation temperature of the pruned branches and bush.

(1) In Case A, the fermentation temperature reached the 60° C. level on the $2^{nd}$ day, and reached 80° C. already on the $7^{th}$ day. In Case B, it was not till the $15^{th}$ day that the fermentation temperature reached the 60° C. level.

(2) In Case A, after reaching 70° C., the fermentation temperature was steadily maintained above 70° C., but in Case B, the highest fermentation temperature was 65° C., and the temperature did not reach 70° C.

(3) Case A had a more rapid increase in its fermentation temperature than that of Case B. Also, the fermentation temperature was steadily maintained at a high level in Case A, which definitely proves that the pro-ferment is effective to accelerate the fermentation of the pruned branches and bush.

By the way, in the above tests, a pro-ferment was mixed with organic wastes such as feces and urine of domestic animals, and pruned branches and bush. The mixture was left in the open air as it was to accelerate the fermentation, however the pro-ferment may also be used in the same manner as described above in generally used conventional plants such as a circular fermenting facility with rotating drum and arms for fermentation, a horizontal gyle with agitators, and a cylindrical gyle with a plurality of rotating blades.

Furthermore, in the embodiments, organic wastes which are converted into compost by adding a pro-ferment, which is obtained by mixing a medium with an organic waste, are the feces of domestic animals, pruned branches, bush, loan, and the like. In addition to the wastes, the present invention may be applied to organic wastes such as the refuse of agricultural products generated at farms, markets, or agricultural cooperative associations.

Organic wastes, which are fed to a processor together with a medium to obtain a pro-ferment, such as garbage from households, restaurants, and the like, are used as they are just discharged from households or the like. The volume of the organic wastes may be decreased in advance before being fed to the processor in the matter of course.

What is claimed is:

1. A method of recycling organic waste wherein a pro-ferment, which is obtained by mixing a medium to an organic waste, is mixed with another organic waste to accelerate fermentation of the latter organic waste and produce compost, said medium comprising dried coffee refuse, one of wheat bran and coconut fiber, and a ferment bacillus.

2. The method of recycling organic waste as claimed in claim 1, wherein said latter organic wastes are feces and urine of domestic animals.

3. The method of recycling organic waste as claimed in claim 2, wherein said feces and urine of domestic animals are those of dairy cows, and 0.4 to 0.6 ton of said pro-ferments are mixed with one ton of said feces and urine of dairy cows.

4. The method of recycling organic waste as claimed in claim 2, wherein said feces and urine of domestic animals are feces of dairy cows, and 0.3 to 0.5 ton of said pro-ferments are mixed to one ton of said feces of dairy cows.

5. The method of recycling organic waste as claimed in claim 1, wherein said the latter organic waste is one of the pruned branches, bush, lawn, and mixture of these materials.

* * * * *